United States Patent [19]
Paruchuri et al.

[11] Patent Number: 5,755,896
[45] Date of Patent: May 26, 1998

[54] LOW TEMPERATURE LEAD-FREE SOLDER COMPOSITIONS

[75] Inventors: Mohan R. Paruchuri, Gainsborough; Dongkai Shangguan, Novi, both of Mich.

[73] Assignee: Ford Motor Company, Dearborn, Mich.

[21] Appl. No.: 753,575

[22] Filed: Nov. 26, 1996

[51] Int. Cl.[6] ............... C22C 7/00; C22C 12/00; C22C 13/02; C22C 30/04

[52] U.S. Cl. ............ 148/400; 148/442; 420/577; 420/562; 420/589

[58] Field of Search ............... 148/400, 442; 420/589, 562, 577

[56] References Cited

U.S. PATENT DOCUMENTS

| | | | |
|---|---|---|---|
| 1,565,115 | 12/1925 | Speed et al. | 420/557 |
| 3,157,473 | 11/1964 | Acton | 428/626 |
| 3,503,721 | 3/1970 | Lupfer | 428/633 |
| 3,607,253 | 12/1969 | Cain et al. | 420/562 |
| 4,214,903 | 7/1980 | Murabayashi et al. | 420/577 |
| 4,615,846 | 10/1986 | Yoshino et al. | 264/13 |
| 4,797,328 | 1/1989 | Boehm et al. | 428/621 |
| 4,806,309 | 2/1989 | Tulman | 420/562 |
| 5,328,660 | 7/1994 | Gonya et al. | 420/562 |
| 5,344,607 | 9/1994 | Gonya et al. | 420/562 |
| 5,368,814 | 11/1994 | Gonya et al. | 420/587 |
| 5,429,689 | 7/1995 | Shangguan et al. | 148/400 |
| 5,455,004 | 10/1995 | Slattery et al. | 420/562 |

FOREIGN PATENT DOCUMENTS

| | | |
|---|---|---|
| 715927 | 6/1996 | European Pat. Off. |
| 51-108625 | 9/1976 | Japan. |
| 55-024720 | 2/1980 | Japan. |

*Primary Examiner*—Sikyin Ip
*Attorney, Agent, or Firm*—Damian Porcari

[57] ABSTRACT

Solder compositions (by weight percent) (1) comprising between 37–53% tin, 37–57% bismuth, and 6–10% indium and having a melting temperature between 99°–124° C., and (2) comprising between 48–58% tin, 40–50% bismuth, and 2–5% indium and having a melting temperature between 125–157.

2 Claims, No Drawings

LOW TEMPERATURE LEAD-FREE SOLDER COMPOSITIONS

BACKGROUND OF THE INVENTION

1. Technical Field

The present invention relates to solder compositions comprising tin, bismuth and indium. More particularly, the present invention relates to solder compositions having (1) between 37–53% tin, 37–57% bismuth, and 6–10% indium and having a melting temperature between 99°–124° C., and (2) between 48–58% tin, 40–50% bismuth, and 2–5% indium and having a melting temperature between 125°–157° C., all percentages are by weight.

2. Description of the Related Art

It is known to manufacture electrical solders without the presence of lead. Lead has been found to be a toxic material whose handling and disposal increases manufacturing costs and complexity. A number of electrical solders have been proposed that do not include lead. These solders generally contain tin (Sn), indium (In), bismuth (Bi), silver (Ag) and a variety of other materials. A summary of these lead free solders is outlined in Table 1.

TABLE 1

(Prior Art)

| No. | U.S. Pat. No. | Sn [Wt %] | In [Wt %] | Bi [Wt %] | Ag [Wt %] | Other [Wt %] | Melting [°C.] |
|---|---|---|---|---|---|---|---|
| 1 | 4,806,309 | 90–95 | — | 1–4.5 | 0.1–0.5 | 3–5 Sb | 218–235 |
| 2 | 1,565,115 | 87–92 | — | — | 8–13 | 3 Au, Pd | 283–330 |
| 3 | 4,797,328 | 86–99 | 0–10 | — | 0–13 | 1–10 Ti,Zr | 700–950 |
| 4 | 3,607,253 | 89.4–95.1 | — | 1–5 | 3–3.8 | 0.7–1.3 Cd | 210 |
| 5 | 3,157,473 | (1) — | 100 | — | — | — | 157 |
|   |   | (2) — | 97 | — | 3 | — | 144 |
|   |   | (3) 49.1 | 50.9 | — | — | — | 120 |
| 6 | 3,503,721 | 90–98 | — | — | 2–10 | — | 220 |
| 7 | 5,455,004 | 82–90 | 35–6 | 1 | — | 4.5–6 | 190 |
| 8 | 5,429,689 | 80.0 | 5–14.5 | 4.5–14.5 | 0.5 | — | 175–220 |
| 9 | 5,344,607 | 90 | 8 | 2 | — | — |   |
| 10 | 5,328,660 | 78.4 | 9.8 | 9.8 | 2 | — |   |
| 11 | 4,214,903 | 22–35 | 2–12 | 53–76 |   |   |   |

U.S. Pat. No. 4,797,328, teaches alloy compositions that have melting temperatures that are too high for soldering applications. U.S. Pat. Nos. 1,565,115, 4,806,309, 3,607,253, 3,503,721, 5,455,004, 5,429,689, 5,344,607, and 5,328,660, teach solder compositions that have melting temperatures that are too high for applications envisioned by the present invention. Generally, they are unsuitable for soldering on low cost thermoplastic substrates. They generally have melting temperatures between 175°–330° C. Because soldering takes place at temperatures at least 10°–15° C. above the liquidus temperature of the solder alloy, the substrate would be exposed to temperatures above 185° C. Further, U.S. Pat. No. 3,607,253 teaches a solder composition that contains cadmium (Cd) which is also toxic and difficult to handle and dispose of.

U.S. Pat. No. 3,157,473, teaches solder compositions that contain 50.9%–100% indium. Indium is extremely expensive and a limited mineral reserve. Solder's having large quantities of indium are generally impracticable for high volume production use as anticipated by the present invention.

U.S. Pat. No. 4,214,903 teaches a sealing material for use within a rotating plug of a nuclear reactor. The sealing material was not selected for its ability to reliably secure an electrical component to a circuit board, and its high bismuth content (53–76%) makes it a very brittle material. It is unsuitable for automotive applications because it cannot withstand the high thermomechanical and other loadings on the solder joint during the fabrication and operation of an electronic assembly. Further, it's fabrication and use in the area of nuclear sealing material would not led one of ordinary skill in the art to identify this material for use as an electrical solder.

SUMMARY OF THE INVENTION

Currently, the vast majority of electronics manufacturing activities use the eutectic tin-lead (63% Sn–37% Pb) solder, the melting temperature of which is 183° C. It is useful to identify a solder that is lead-free and therefore less toxic to users, but also has a low melting temperature. Lower melting temperature solders not only protect electrical components from damage in the soldering process, they also enable the electrical components to be attached to a lower heat deflection temperature substrate. It is desirable to use thermoplastic materials as substrates. Such use is outlined in U.S. patent application Ser. No. 08/642,723, filed May 3, 1996, which is incorporated herein by reference. It is desirable to attach the electrical components directly to the thermoplastic substrate without a separate carrier or heat shield. Therefore, it is desirable to identify a solder that has a melting temperature below the heat deflection temperature of the thermoplastic material. Typical materials include polypropylene, nylon, acrylonitrile-butadiene-styrene (ABS), and polycarbonite. Depending on the additives and the specific formulation, these materials have glass transition temperatures between 135° and 175° C. It is also desirable to produce a lead free solder with a low melting temperature and good thermal and electrical conductivities and mechanical properties.

Preferably, such solder should exhibit a melting temperature below 160° C. Such low melting temperature solders enable the use of lightweight and low cost substrate materials. It also enables the use of items that heretofore were not used for the direct attachment of electrical components. For example, thermoplastic substrates in products such as automotive instrument panels and air ducts may directly receive electrical components.

The present invention is directed to solder compositions comprising tin, bismuth and indium. More particularly, the present invention relates to solder compositions (in weight percent) (1) having between 37–53% tin, 37–57% bismuth, and 6–10% indium and having a melting temperature between 99°–124° C., and (2) having between 48–58% tin, 40–50% bismuth, and 2–5% indium and having a melting temperature between 125°–157° C. Small amounts (between 0.1–3 Wt. %) of copper (Cu), silver, tellurium (Te), selenium (Se), cesium (Cs), gold (Au), and/or nickel (Ni) and combinations thereof may be added to improve the mechanical and other properties of the solder.

The composition of the present invention exhibits a multi-phase microstructure, consisting of primary phases, intermetallic phases, and eutectic phases.

Finally, it is also a desired feature of the present invention to provide a solder exhibiting favorable thermal and electrical conductivities and satisfactory mechanical properties. Yet another object of the invention is to provide a low temperature lead-free solder composition that is affordable and in a reasonable supply for large volume production use. These and other advantages, features and objects of the present invention will become more apparent to those of ordinary skill in the art upon reference to the following description.

DETAILED DESCRIPTION OF THE PREFERRED EMBODIMENTS

The solders of the present invention include compositions having: (1) 37–53% tin, 37–57% bismuth, and 6–10% indium, or (2) 48–58% tin, 40–50% bismuth, and 2–5% indium (all percentages are by weight).

Fabrication of sample compositions.

Solder samples were fabricated using well-established methods. High purity metals were used as starting materials. These included 99.99+% Sn shots, 99.9 Bi shots, and 99.99+% In shots. These ingredients were mixed in predetermined proportions. Alumina crucibles were used. The ingredients were melted in a tube furnace under a flowing $N_2$ atmosphere to prevent oxidation. The alloy was kept in a molten state for several hours for homogenization. Furnace temperature was measured with thermocouples and recorded with a chart recorder.

The following samples were made by mixing powders of each material with the proportions shown below.

TABLE 2

| Alloy Sample No. | Chemical Analysis. Element (weight percentage) | | | Melting Temperature (°C.) |
|---|---|---|---|---|
| | Sn | Bi | In | |
| 1 | 28 | 57 | 15 | 80–104 |
| 2 | 31.5 | 57 | 11.5 | 80–111 |
| 3 | 33 | 57 | 10 | 80–116 |
| 4 | 37 | 57 | 6 | 100–124 |
| 5 | 0 | 67 | 33 | 110 |
| 6 | 43 | 47 | 10 | >99–115 |
| 7 | 43 | 37 | 20 | 78–141 |
| 8 | 43 | 27 | 30 | 68–135 |
| 9 | 43 | 52 | 5 | 100–128 |
| 10 | 43 | 43 | 14 | 78–105 |
| 11 | 38 | 47 | 15 | 80–106 |
| 12 | 48 | 42 | 10 | 100–121 |
| 13 | 48 | 47 | 5 | 127–139 |
| 14 | 48 | 50 | 2 | 135–137 |
| 15 | 53 | 37 | 10 | 100–123 |
| 16 | 53 | 42 | 5 | 125–146 |
| 17 | 53 | 45 | 2 | 136–146 |
| 18 | 58 | 32 | 10 | 100–170 |
| 19 | 58 | 37 | 5 | 124–164 |
| 20 | 58 | 40 | 2 | 133–157 |
| 21 | 63 | 27 | 10 | 100–175 |
| 22 | 63 | 32 | 5 | 116–178 |
| 23 | 63 | 35 | 2 | 131–176 |
| 24 | 68 | 22 | 10 | 100–179 |
| 25 | 68 | 27 | 5 | 117–181 |
| 26 | 68 | 30 | 2 | 130–181 |
| 27 | 73 | 17 | 10 | 160–185 |
| 28 | 73 | 22 | 5 | 116–189 |
| 29 | 73 | 25 | 2 | 130–189 |

Samples were taken from each alloy ingot and submitted for chemical analysis. Results indicate that the final alloy composition is close to the starting composition.

A metallurgical examination using metallotraphy and electron microscopy has revealed that the alloys have a very fine microstructure. The microstructure of the preferred alloy from the first group such as alloy number 4 consists of a pseudo-eutectic Bi/γ phase and a γ phase, while γ is a Sn-In intermetallic phase. The microstructure of the preferred alloy from the second group such as alloy number 14 consists of a pseudo-eutectic Bi/β-Sn (with dissolved In) and β-Sn (with dissolved In). Such a microstructure enhances the fatigue/creep resistance and is essential for the reliability of solder interconnects. Inclusion of indium is also helpful for enhancing fatigue/creep resistance via grain growth control. It is thought that the intermetalic particles impede grain growth and retard grain coarsening.

The melting temperatures of the alloys in Table 2 were determined by differential scanning calorimetric (DSC) analysis. Melting temperatures below 160° C. are especially useful when soldering electrical components directly to thermoplastics. They have the additional benefit of protecting delicate electrical components from excessive heat during the soldering process.

Another feature of the present solders is their stability after thermal aging. This long term thermal stability is essential for solder interconnects used in automotive applications.

Differential Scanning-Calorimetric (DSC) Analysis.

Samples were taken for each alloy ingot for DSC analysis. The analysis was performed using a DuPont DSC 2910 system under a flowing $N_2$ atmosphere at a given heating/cooling rate (5° C./minute). Characteristic temperatures from the thermograms were analyzed to determine the solidus and liquidus temperatures of the alloys, which are summarized in Table 2 above.

Microstructural Analysis.

Microstructural analysis was performed using chemical etching, optical microscopy, scanning electron microscope (SEM) microprobe, and x-ray diffraction (XRD). Suitable etchants for the disclosed alloys include a solution of methanol (100 ml) and hydrochloric acid (1 ml) for 10 seconds.

Based on the melting temperature of the alloys, alloys number 4, 6, 12, and 15 (melting temperature between 99°–124° C.) were considered to be the preferred alloys for very low temperature soldering, and alloys number 13, 14, 16, 17, and 20 (melting temperature between 125°–157° C.) were considered to be the preferred alloys for moderate temperature soldering. Both groups of solders may be used with thermoplastic substrates.

The microhardness of these alloys have been measured on a microhardness tester. Thirty measurements were taken for each sample using a 25 g load for 0.5 seconds and the average was taken for each sample. The results of the hardness (expressed as a Knoop hardness number or KHN) are summarized in the table below.

TABLE 3

| Alloy No. | 4 | 13 | 14 | 16 | 17 | 20 |
|---|---|---|---|---|---|---|
| Microhardness (KHN) | 25 | 28 | 27 | 30 | 28 | 31 |

The microstructures of the alloys were examined with a scanning electron microscope and results are summarized in the table below.

TABLE 4

| Alloy No. | Microstructure |
|---|---|
| 4 | (pseudo-eutectic) Bi/γ + γ (Sn—In intermetallic) |
| 13 | (pseudo-eutectic) Bi/γ + γ (Sn—In intermetallic) |
| 14 | (pseudo-eutectic) Bi/β-Sn (with dissolved In) + β-Sn (with dissolved In) |
| 16 | (pseudo-eutectic) Bi/γ + γ (Sn—In intermetallic) |
| 17 | (pseudo-eutectic) Bi/β-Sn (with dissolved In) + β-Sn (with dissolved In) |
| 20 | (pseudo-eutectic) Bi/β-Sn (with dissolved In) + β-Sn (with dissolved In) |

Based on the data presented, alloy number 4 having 37% Sn, 57% Bi, and 6% In and a melting temperature between 100°–124° C. is considered to be the most preferred composition in the first group, and alloy number 14 having 48% Sn, 50% Bi and 2% In and a melting temperature between 135°–137° C. is considered to be the most preferred composition in the second group.

Application.

The alloys were found to be non-toxic and readily manufacturable. They produced few toxic or hazardous waste materials and utilized existing commercial equipment for manufacturing and usage. Because of the relatively low indium content, the alloys were low cost and suitable for production in large commercial quantities.

The solders made from these compositions may be used in either a paste form (as in reflow soldering) or alternatively in bar solder form (as in wave soldering). Regular soldering processes (reflow, wave soldering and others) may be used with the solder compositions. In each case, the soldering peak temperature will generally be at least 10°–15° C., preferably 15°–30° C., above the melting temperature of the solder alloy.

Different alloys may be adapted for different substrate materials. Alloys in the first group, i.e. alloys number 4, 6, 9, 12, and 15, with alloy number 4 being the most preferred composition, may be used with cheaper thermoplastic substrate materials for products that do not experience excessive heat in the use environment, such as electronic products that are located in the automotive passenger compartment and consumer electronic products, and alloys in the second group, i.e. alloys number 13, 14, 16, 17, and 20, with alloy number 14 being the most preferred composition, may be used for products that do experience relatively higher temperatures, such as electronic products that are located in certain areas of the automotive underhood environment as well as consumer electronic products with power devices. Such a portfolio of solder compositions makes it possible to select the solder alloy to match the thermoplastic substrate material and the use environment.

While the best mode for carrying out the present invention has been described in detail, those familiar with the art to which the invention relates will recognize various alternative designs and embodiments for practicing the invention as defined by the following claims.

What is claimed:

1. An electrical solder composition useful for soldering electrical components atop low-temperature thermoplastic substrates consisting of:

between 37–53% Sn;

37–57% Bi;

6–10% In;

0.1–3% of at least one of the following: Te, Se, Cs, Au, and Ni; and having a melting point between 135°–137° C., a microhardness of between 25–31 KHN, and a multi-phase microstructure consisting of a pseudo-eutectic Bi/γ phase and a γ phase, while γ is a Sn-In intermetallic phase.

2. A lead-free electrical solder composition useful for soldering electrical components atop low-temperature thermoplastic substrates consisting of:

between 48–58% Sn;

40–50% Bi;

2–5% In;

0.1–3 Wt. % of at least one of the following: Te, Se, Cs, Au, and Ni; and having a melting temperature between 125°–157° C., a microhardness of between 25–31 KHN, and a multi-phase microstructure consisting of a β-Sn phase with dissolved In and a Bi/β-Sn pseudo-eutectic phase.

* * * * *